Patented Aug. 9, 1932

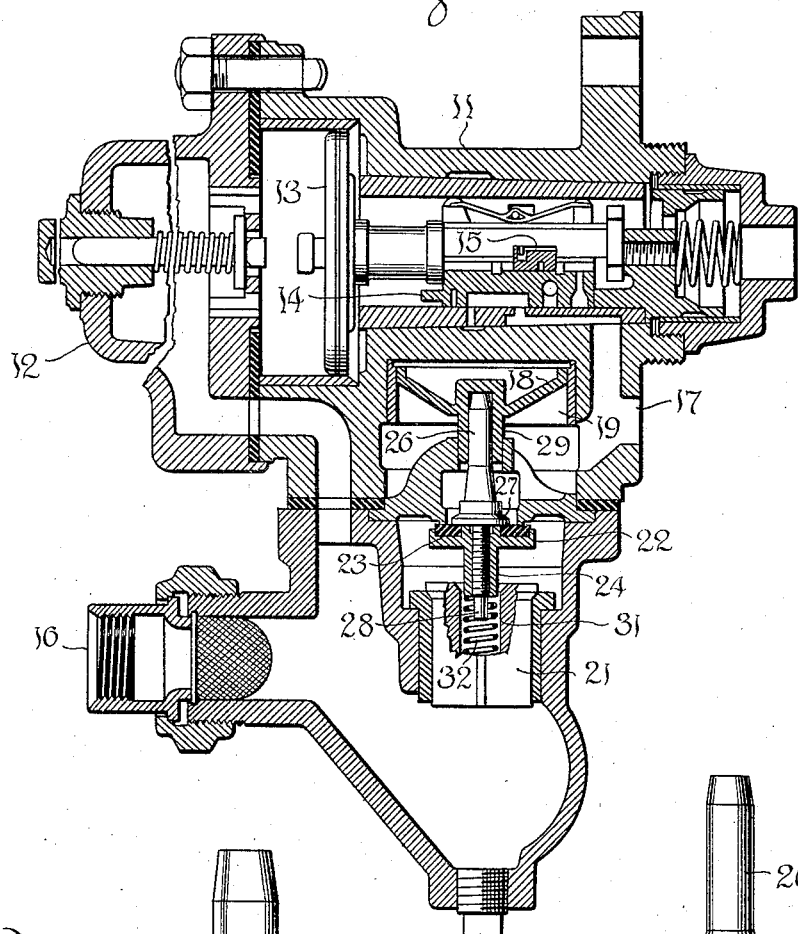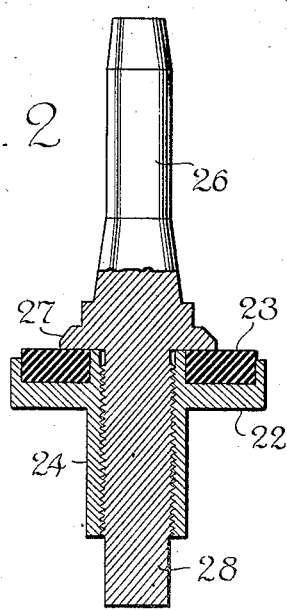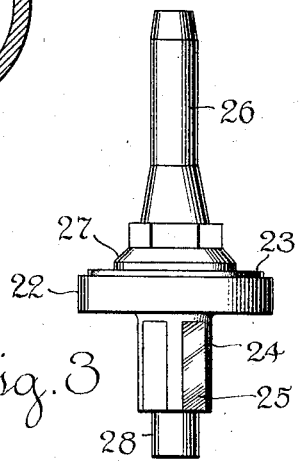

1,871,109

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

VALVE FOR AIR BRAKES

Application filed August 25, 1928. Serial No. 302,057.

The present invention relates to air brakes and particularly to the emergency valve element forming a part of triple valves.

Such valves include a piston controlled by the triple slide valve and a poppet type emergency valve having a stem in thrust relation with the piston, and guided in a recess in the piston. On the opposite side from its sealing face the emergency valve has a pilot or guide which extends into a guideway in a reversely seated check valve. A compression spring confined in the guide between the second valve and the pilot of the emergency valve holds both valves normally seated.

As heretofore constructed the valve with its stem and pilot have been cast in one piece, of brass. The stems are frequently bent in use, causing serious operation and maintenance difficulties.

The present invention provides a construction in which the valve body and pilot may be cast brass, while the stem may be of harder material, such as forged bronze. This stem is so contrived as to reinforce the pilot and lock the sealing insert in place in the face of the valve.

The preferred embodiment of the invention is illustrated in the accompanying drawing, in which,—

Fig. 1 is a vertical axial section of a triple valve showing the improved emergency valve in place.

Fig. 2 is an elevation of the emergency valve on an enlarged scale, partly broken away to show the construction.

Fig. 3 is an elevation on a somewhat smaller scale.

In Fig. 1 the body of the triple valve is shown at 11, the front cap at 12, triple piston at 13, triple slide valve at 14, and graduating valve at 15. The brake pipe connection is shown at 16 and the brake cylinder connection at 17.

The emergency piston 18 works in a cylinder bushing 19 and is controlled by valve 14, which in emergency position only, admits auxiliary reservoir air against the upper face of piston 18, to force the piston downward.

A break pipe port check 21 is used to prevent back flow from brake cylinder connection to the brake pipe at all times, the valve opening when brake pipe pressure predominates, if the emergency valve is open, to permit brake pipe air to flow to the brake cylinder.

The construction of the parts so far described is not a feature of the invention, but is well known and subject to considerable variation.

The emergency valve comprises a valve disk 22, conveniently of cast brass, annularly recessed on the upper or sealing face to receive a rubber gasket 23. On the lower face is a tubular pilot 24 which is theraded internally, and fluted externally as indicated at 25 (Fig. 3).

A stem 26 of forged bronze or other suitable strong non-corrosive metal is threaded through the pilot 24 and carries a flange 27 which clamps the gasket 23. The extreme end 28 of the stem 26 is unthreaded and extends beyond the pilot 24.

This valve structure is assembled with the triple valve in the usual manner. The stem 26 is retained in the tubular hub 29 of piston 18, while the pilot 24 is guided in the guideway 31 in valve 21. A coil compression spring 32 is confined in guideway 31 with its upper end encircling the projecting end portion 28 of stem 26 and seating against the end of pilot 24.

When valve 14 is shifted to emergency position piston 18 is forced down unseating the emergency valve. Predominant brake pipe pressure opens valve 21 permitting brake pipe air to flow to the brake cylinder. The valve 21 closes against reverse flow. The bronze stem reinforces the pilot 24 so that stem and pilot are both much stronger than similar parts in prior structures.

What is claimed is,—

1. An emergency valve for use in triple valves, comprising in combination, a valve body having a recess in one face and a tubular pilot extending from the opposite face; a gasket seated in said recess; and a stem projecting from the recessed face threaded in and extending entirely through said tubular pilot to reinforce the same, said stem having a flange overhanging a portion of said gasket.

2. An emergency valve for use in triple valves, comprising in combination, a valve body having an annular recess in one face and a tubular pilot extending from the opposite face; a gasket seated in said recess; and a stem projecting from the recessed face threaded in said pilot and reinforcing the same, said stem being shouldered to overhang said gasket and to afford metal-to-metal contact with the central portion of said body.

3. An emergency valve for use in triple valves, comprising in combination, a valve disk having an annular recess in one face and a tubular pilot extending from the opposite face, said pilot being threaded internally and formed externally with longitudinal flutes; a gasket seated in said recess; and a stem projecting from said recessed face and shouldered to overlie the central portion of said gasket and enter into metal-to-metal contact with the central portion of said disk, said stem having a threaded portion engaging and extending through said pilot and an unthreaded portion extending beyond the same.

In testimony whereof I have signed my name to this specification.

CHARLES A. CAMPBELL.